United States Patent [19]

Curran

[11] Patent Number: 5,253,631
[45] Date of Patent: Oct. 19, 1993

[54] AIR/FUEL CONTROL SYSTEM FOR FLEXIBLE FUEL VEHICLES

[75] Inventor: Judith M. Curran, Northville, Mich.

[73] Assignee: Ford Motor Company, Dearborn, Mich.

[21] Appl. No.: 976,830

[22] Filed: Nov. 16, 1992

[51] Int. Cl.$^5$ ............................................. F02B 75/12
[52] U.S. Cl. ..................................... 123/696; 123/1 A
[58] Field of Search ................ 123/696, 1 A, 494, 479

[56] References Cited

U.S. PATENT DOCUMENTS

| | | | |
|---|---|---|---|
| 4,391,253 | 7/1983 | Ito | 123/478 |
| 4,438,749 | 3/1984 | Schwippert | 123/494 |
| 4,461,258 | 7/1984 | Becker et al. | 123/696 |
| 4,479,464 | 10/1984 | Kondo et al. | 123/696 |
| 4,481,908 | 11/1984 | Iida | 123/1 A |
| 4,522,180 | 6/1985 | Matsuoka et al. | 123/696 |
| 4,526,001 | 7/1985 | Burns et al. | 123/696 |
| 4,594,968 | 6/1986 | Degobert et al. | 123/1 A |
| 4,625,698 | 12/1986 | Jamrog | 123/489 |
| 4,706,629 | 11/1987 | Wineland et al. | 123/478 |
| 4,853,862 | 8/1989 | Shiraishi et al. | 364/431.05 |
| 4,945,863 | 8/1990 | Schmitz et al. | 123/1 A |
| 4,945,880 | 8/1990 | Gonze et al. | 123/478 |
| 4,945,881 | 8/1990 | Gonze et al. | 123/486 |
| 4,945,882 | 8/1990 | Brown et al. | 123/489 |
| 4,945,885 | 8/1990 | Gonze et al. | 123/520 |
| 4,957,087 | 9/1990 | Ota | 123/479 |
| 4,967,714 | 11/1990 | Inoue | 123/489 |
| 4,982,709 | 1/1991 | Oota | 123/339 |
| 4,986,241 | 1/1991 | Inoue et al. | 123/479 |
| 5,094,208 | 3/1992 | Adam et al. | 123/696 |
| 5,144,915 | 9/1982 | Grabs | 123/696 |

Primary Examiner—Raymond A. Nelli
Attorney, Agent, or Firm—Allan J. Lippa; Roger L. May

[57] ABSTRACT

A proportional plus integral feedback control system is responsive to a two-state, filtered output signal from an exhaust gas oxygen sensor. The sensor's output is offset from stoichiometric switching by the presence of alcohol in the fuel blend. A correcting bias term is calculated and the average value of the feedback variable is appropriately biased by selection of the proportional plus integral terms.

9 Claims, 5 Drawing Sheets

AIR/FUEL CONTROL SYSTEM FOR FLEXIBLE FUEL VEHICLES

BACKGROUND OF THE INVENTION

The field of the invention relates to air/fuel control systems for vehicles equipped to run on a blend of alcohol and gasoline fuels.

Air/fuel control systems are known which trim fuel delivered to an engine in response to a comparison of an exhaust gas oxygen sensor (EGO sensor) to a reference value associated with stoichiometric combustion. As shown in FIGS. 1A and 1B, when the EGO sensor output (12) is rich of the reference value (14), a lean correction is generated (high value for signal EGOS in FIG. 1B). When the EGO sensor output (12) is lean of the reference (14), a rich correction is generated (low value of signal EGOS in FIG. 1B).

However, when the fuel includes alcohol (ethanol or methanol), the EGO sensor output is shifted in a direction lean of stoichiometry (as indicated by dashed line 16 in FIG. 1A). Accordingly, the feedback correction signal (EGOS in FIG. 1B) will switch at a value other than stoichiometry resulting in air/fuel operation lean of stoichiometry.

U.S. Pat. No. 4,945,882 attempts to compensate for this lean shift by shifting the reference value (for example, by shifting the reference voltage from line 14 to dash line 18 in FIG. 1A). The inventor herein has recognized a problem with such shifting of the reference voltage. More specifically (as shown at the intersection of dashed lines 16 and 18 in FIG. 1A), the reference comparison would occur during a relatively flat portion of the EGO signal where relatively small changes in output voltage correspond to relatively large changes in air/fuel ratio. A resulting problem is that such a comparison would be more highly susceptible to signal noise adversely affecting air/fuel control.

SUMMARY OF THE INVENTION

An object of the invention herein is to provide an air/fuel control system which compensates for offsets in the exhaust gas oxygen sensor caused by the presence of alcohol in the fuel blend.

The above object is achieved, and problems of prior approaches overcome, by providing both a control system and method for maintaining stoichiometric combustion in an internal combustion engine fueled with a blend of gasoline and alcohol. In one particular aspect of the invention, the method comprises the steps of: comparing an output of an exhaust gas oxygen sensor to a single reference to provide a rich indication when the exhaust gases are rich of the reference and a lean indication when the exhaust gases are lean of the reference; integrating the rich and lean indications to provide a fuel delivery correction signal; biasing the integration as a function of a measured percentage of alcohol in the fuel blend to provide a modified correction signal; and delivering fuel to the engine as a function of both the percent alcohol measurement and the modified correction signal to maintain the stoichiometric combustion.

An advantage of the above aspect of the invention, is that accurate air/fuel control operation at stoichiometry is achieved even though the exhaust gas oxygen sensor switches at a value other than stoichiometry.

BRIEF DESCRIPTION OF THE DRAWINGS

The object and advantages of the invention claimed herein and others will be more clearly understood by reading an example of an embodiment in which the invention is used to advantage with reference to the attached drawings wherein:

DESCRIPTION OF AN EMBODIMENT

Figure 1A:
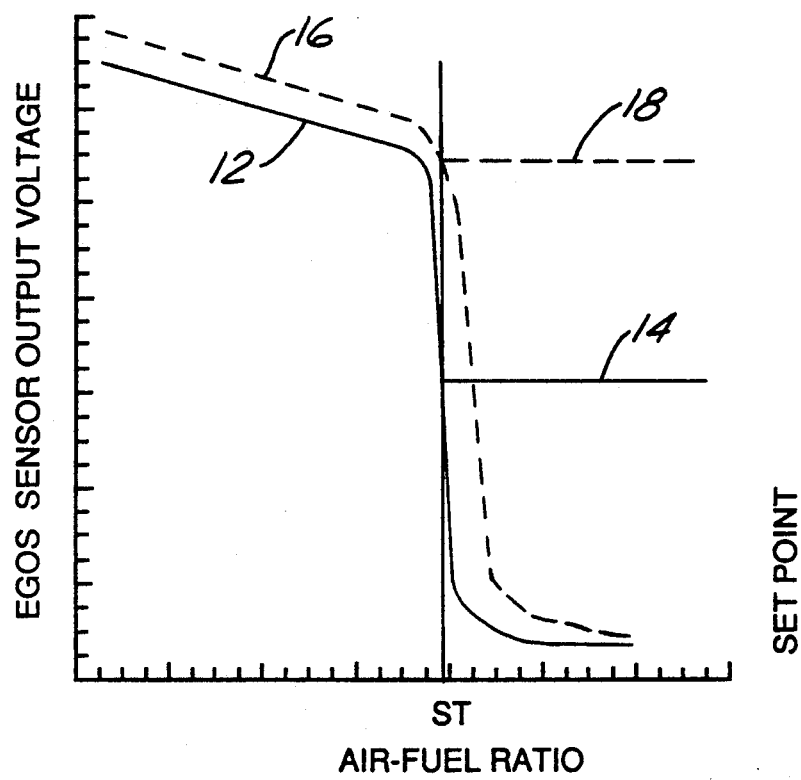
FIGS. 1A and 1B illustrate various outputs of an exhaust gas oxygen sensor.
Figure 1B:
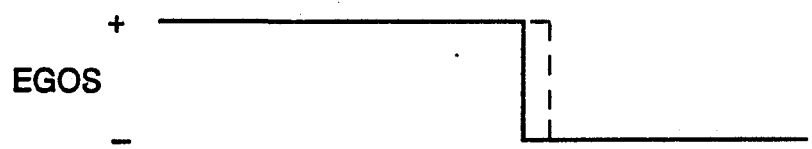
Figure 2:
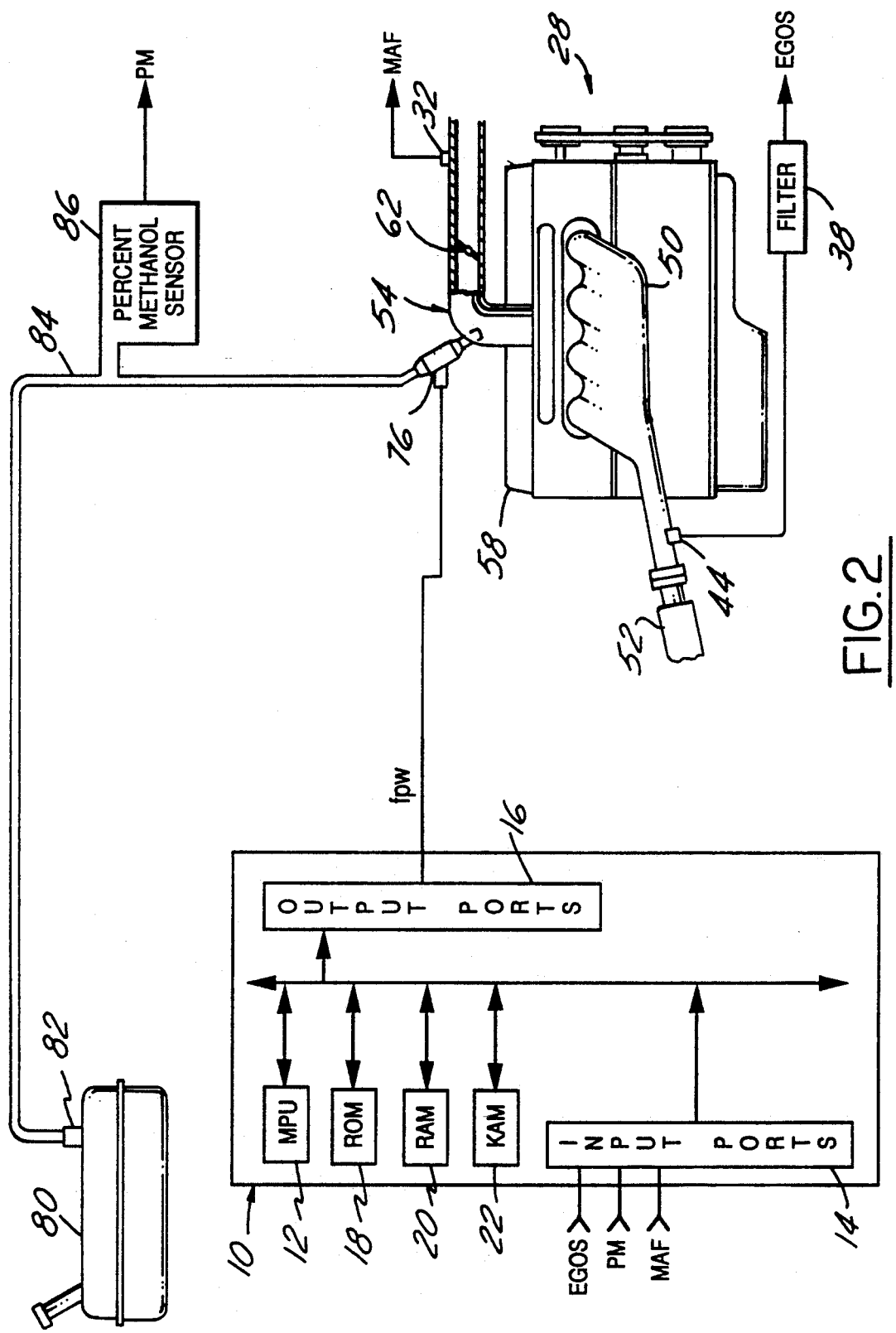
FIG. 2 is block diagram of an embodiment wherein the invention is used to advantage.

Controller 10 is shown in the block diagram of FIG. 2 as a conventional microcomputer including: microprocessor unit 12; input ports 14; output ports 16; read only memory 18, for storing control programs; random access memory 20, for temporary data storage which may also be used for counters or timers; keep-alive memory 22 for storing learned values; and a conventional data bus. As described in greater detail later herein with particular reference to the remaining Figures, controller 10 controls the liquid fuel delivered to engine 28 via pulse width signal fpw in response to measurement of inducted mass airflow (MAF) from mass airflow sensor 32, and output signal EGOS from filter circuit 38. As shown in FIGS. 1A and 1B, signal EGOS is generated by comparing the output voltage of EGO sensor 44 (line 16) to the reference voltage (line 14) selected at the midpoint in peak-to-peak excursion of output voltage from EGO sensor 44.

In this particular example, EGO sensor 44 is shown coupled to exhaust manifold 50 of engine 28 upstream of conventional catalytic converter 52. Intake manifold 58 of engine 28 is shown coupled to throttle body 54 having primary throttle plate 62 positioned therein. Throttle body 54 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Percent methanol sensor 86, a conventional capacitive dielectric sensor in this particular example, is shown coupled to fuel rail 84 for providing percent methanol signal PM. Although a blend of up to 85% methanol and 15% gasoline is contemplated in this particular example, the inventive concept described herein may be used to advantage with any blend of methanol or other alcohol based fuel such as ethanol.

Figure 3:
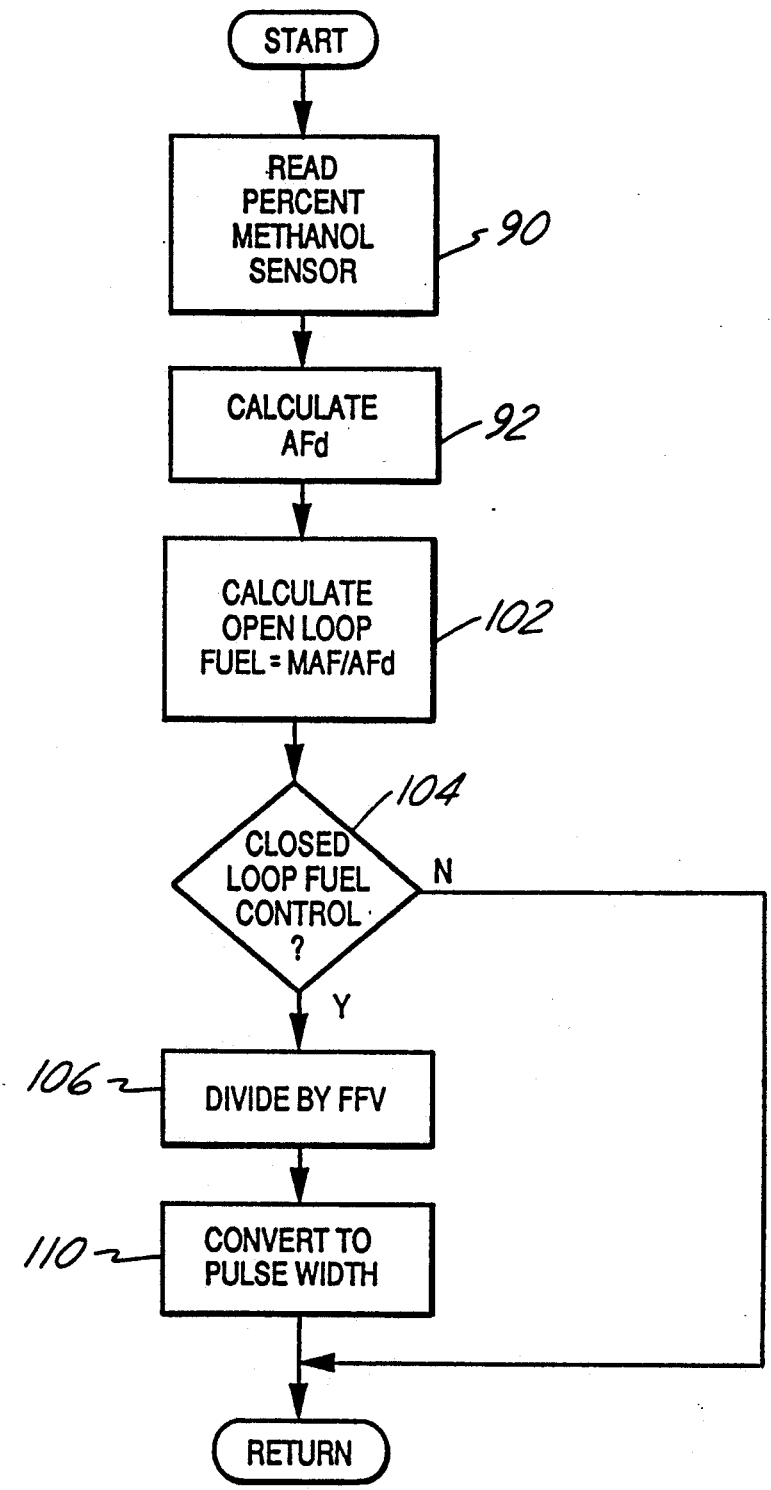
FIGS. 3-4 are high level flowcharts illustrating various steps performed by a portion of the embodiment illustrated in FIG. 2.

A flowchart of the liquid fuel delivery routine executed by controller 10 for controlling engine 28 is now described with reference to the flowchart shown in FIG. 3. In response to reading the percentage of methanol in the fuel blend (step 90), a desired or reference air/fuel ratio (AFd) is calculated during step 92 to achieve stoichiometric combustion for the particular fuel blend utilized.

An open loop calculation of desired liquid fuel is then calculated in step 102. More specifically, the measurement of inducted mass airflow (MAF) is divided by the desired air/fuel ratio AFd. After a determination is made that closed loop or feedback control is desired (step 104), the open loop fuel calculation is trimmed by fuel feedback variable FFV to generate desired fuel signal fd during step 106. This desired fuel signal is converted into fuel pulse width signal fpw for actuating fuel injector 76 (step 110).

The air/fuel feedback routine executed by controller 10 to generate fuel feedback variable FFV and appropriately bias the air/fuel operation in response to the percentage of methanol is now described with reference to the flowchart shown in FIG. 4. After determination is made that closed loop (i.e., feedback) air/fuel control is desired in step 120, percent methanol sensor 86 is read during step 122. An air/fuel bias is calculated during step 124 in proportion to the percentage of methanol (or other alcohol constituent) in the fuel blend. As described in greater detail later herein, this bias will compensate for the offset in the output voltage of EGO sensor 44 caused by alcohol fuel content by selection of the proportional terms (Pi and Pj) and integral terms ($\Delta i$ and $\Delta j$) of the proportional plus integral feedback control system.

If the calculated bias value is zero (step 128), integral terms $\Delta i$ and $\Delta j$ are each set equal to value X. Similarly, proportional terms Pi and Pj are each set equal to value Y when the bias calculation from step 128 is zero. When the calculated bias is greater than zero (step 128), but less than preselected bias B1 (step 134), integral terms $\Delta i$ and $\Delta j$ are each set equal to preselected value X (step 136). Proportional term Pj is set equal to predetermined value Y (step 136). And proportional term Pi is set equal to a preselected percentage of proportional term Pj (step 136).

When the bias value calculated in step 124 is greater than predetermined bias B1 (step 134), proportional term Pj is set equal to predetermined value Y and proportional term Pi is set equal to zero (step 138). Concurrently, integral term $\Delta i$ set equal to preselected value X. And integral term $\Delta j$ is increased by a predetermined percentage over integral term $\Delta i$ (step 138).

After the integral terms ($\Delta i$ and $\Delta j$) and proportional terms (Pi and Pj) are determined, the filtered, two-state exhaust gas oxygen sensor signal (EGOS) is sampled during steps 150, 154, and 174. When signal EGOS is low (step 150), but was high during the previous background loop (step 154), proportional term Pj is subtracted from feedback variable FFV (step 158).

Similarly, when signal EGOS is high (step 150) and was also high during the previous background loop of microcontroller 10 (step 174), integral term $\Delta i$ is added to feedback variable FFV (step 178). When signal EGOS is high (step 150), but was low during the previous background loop (step 174), proportional term Pi is added to feedback variable FFV (step 182).

Figure 4:
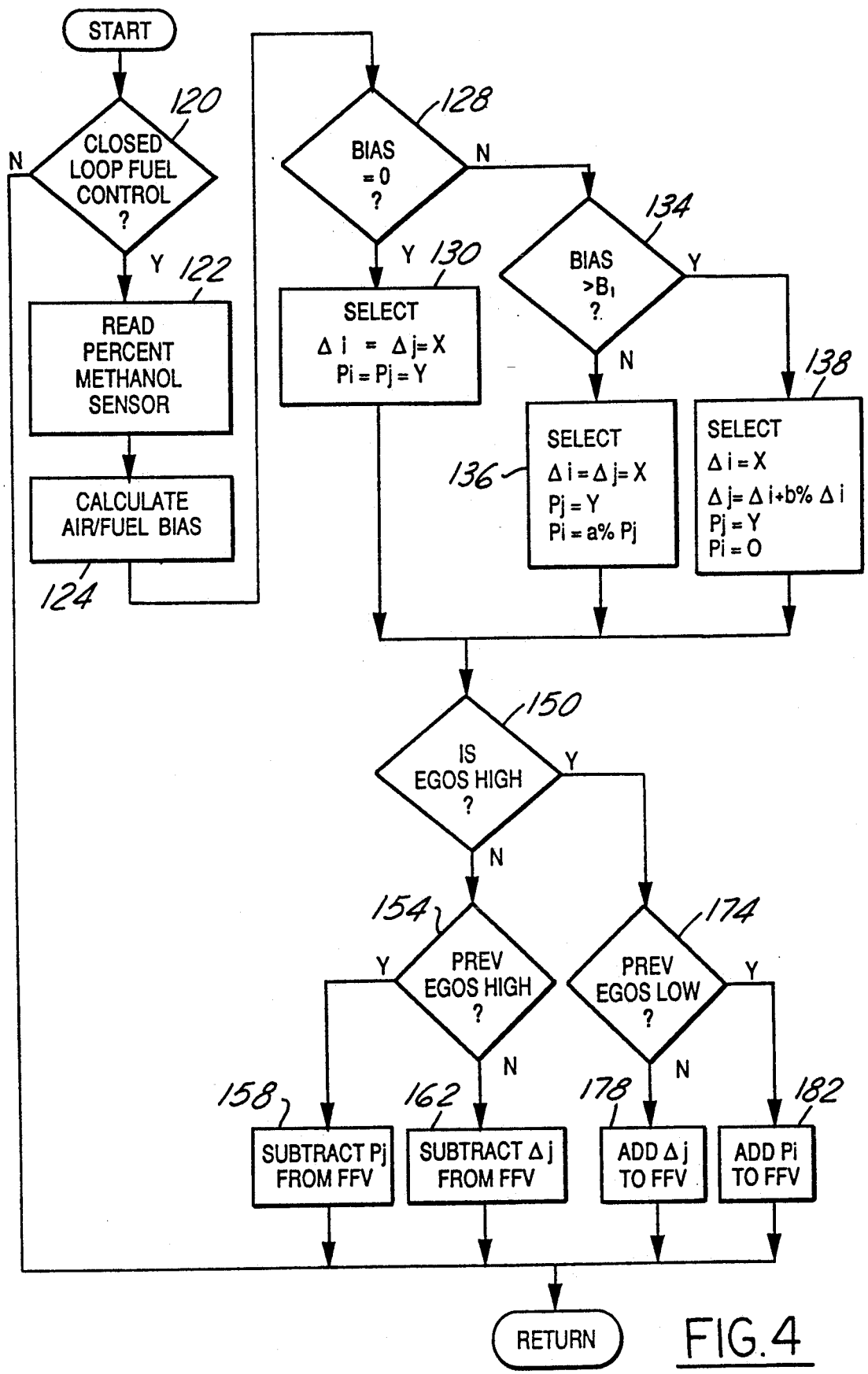
Figure 5A:
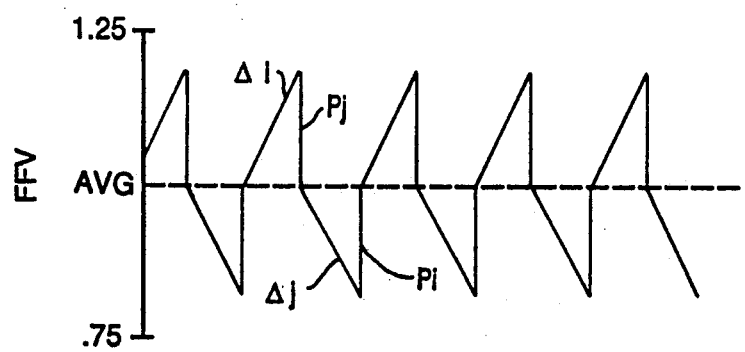
FIGS. 5A-5B, 6A-6B, and 7A-7B illustrate various electrical waveforms generated by a portion of the embodiment shown in FIG. 2.
Figure 5B:

The operation described above with particular reference to the flowchart shown in FIG. 4 may be better understood by reviewing the examples of operation represented by the waveforms shown in FIGS. 5A-B, 6A-B, and 7A-B. More specifically, FIG. 5A depicts feedback variable FFV as a function of time under conditions when the calculated bias is zero (i.e., fuel alcohol content negligible). The average value of FFV is shown at unity and, consequently, the corresponding signal EGOS shown in FIG. 5B is at a 50% duty cycle (i.e., no bias).

Figure 6A:
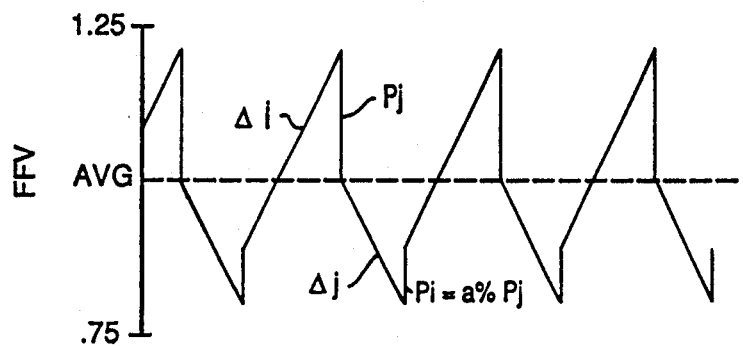
Figure 6B:
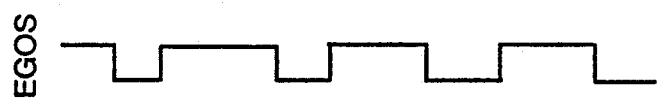

FIGS. 6A and 6B depict operation when the calculated bias value (see steps 128, 134, and 136 in FIG. 4) is greater than zero, but less than predetermined bias B1. It is noted that proportional term Pi (in the direction of decreasing liquid fuel delivery) is made a percentage of proportional term Pj (in the direction of increasing liquid fuel delivered). Accordingly, the average value of feedback variable FFV is biased to a value less than unity. Thus, a rich bias is introduced in the air/fuel feedback control system to compensate for a lean offset in the output voltage of EGO sensor 44 which is caused by a particular percentage alcohol content in the fuel blend. Stated another way, average air/fuel operation at stoichiometry is achieved even though the output voltage of EGO sensor 44 is switching at a value offset from stoichiometry. Under these conditions, it is noted that the duty cycle of signal EGOS is greater than 50% on the "high" voltage side as shown in FIG. 6B.

Figure 7A:
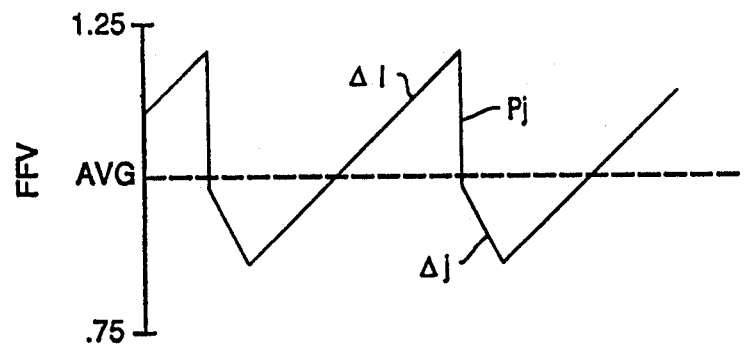
Figure 7B:
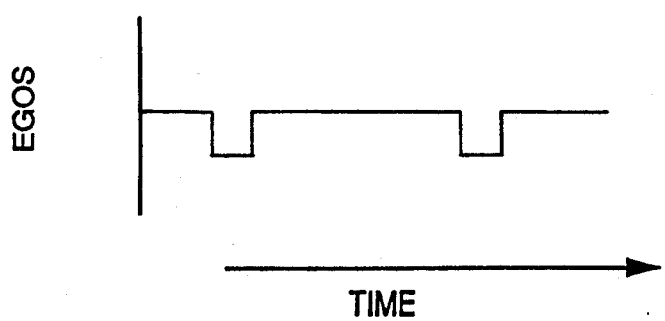

Generation of feedback variable FFV by controller 10 is shown in FIGS. 7A and 7B under conditions when the calculated bias value is greater than preselected bias value B1 (as described in steps 128, 130, 134, and 138 in FIG. 4). As shown in FIG. 7A, proportional term Pi (in the direction of providing a lean fuel correction) is set equal to zero. Concurrently, integration step $\Delta j$ (in the direction of providing a rich fuel correction) is set at a greater value than integration step $\Delta i$ (in the direction of providing a lean fuel correction). Accordingly, the average value of feedback variable FFV is biased to a value less than unity thereby correcting for the offset in the output of EGO sensor 44 caused by a particular percentage content of alcohol in the fuel blend. The effect of introducing this bias to air/fuel control is demonstrated by signal EGOS (shown in FIG. 7B with a duty cycle biased considerably towards a rich output indication).

Although one example of an embodiment which practices the invention has been described herein, there are numerous other examples which could also be described. For example, analog devices, or discrete ICs may be used to advantage rather than a microcomputer. The invention is therefore to be defined only in accordance with the following claims.

What is claimed:

1. A fuel control method for maintaining stoichiometric combustion in an internal combustion engine fueled with a blend of gasoline and alcohol, comprising the steps of:

measuring an output of a percent alcohol sensor indicating a percent alcohol in the fuel blend;

comparing an output of an exhaust gas oxygen sensor to a single reference to provide rich indication when the exhaust gases are rich of said reference and a lean indication when the exhaust gases are lean of said reference;

integrating said rich and lean indications to provide a fuel delivery correction signal;

biasing said integration as a function of said percent alcohol measurement in the fuel blend to provide a modified correction signal thereby compensating for a lean shift in said exhaust gas oxygen sensor output caused by presence of alcohol in the fuel blend; and delivering fuel to the engine as a function of both said percent alcohol measurement and said correction signal to maintain the stoichiometric combustion.

2. The control method recited in claim 1 wherein said fuel delivering step further comprises the steps of: generating a desired air/fuel ratio as a function of said percent alcohol measurement; and dividing a measurement of airflow inducted into the engine by both said desired air/fuel ratio and said fuel delivery correction signal.

3. The control method recited in claim 1 wherein the alcohol in the fuel blend comprises methanol.

4. A fuel control method for delivering a blend of gasoline and alcohol into the air/fuel intake of an internal combustion engine to maintain stoichiometric combustion, comprising the steps of:

measuring an alcohol content in the fuel blend;

providing an electrical signal having a first voltage polarity when exhaust gas oxygen level is below a reference value and having a second voltage polarity opposite said first voltage polarity when said exhaust oxygen level is above said reference value;

integrating said electrical signal to provide a fuel delivery correction signal;

offsetting said integration in said second voltage polarity direction as a function of said alcohol content in the fuel blend thereby compensating for a lean shift in said exhaust gas oxygen sensor output caused by presence of alcohol in the fuel blend; and increasing fuel delivered to the engine in relation to said alcohol content and decreasing fuel delivered to the engine in relation to said offset fuel delivery correction signal.

5. The control method recited in claim 4 wherein said integration is performed in discrete steps and an integration step in said second polarity is made larger than an integration step in said first polarity when said alcohol content increases to a predetermined percentage.

6. The control method recited in claim 4 wherein said reference value is at a midpoint in peak-to-peak value of said electrical signal.

7. A fuel control method for delivering a blend of gasoline and alcohol into the air/fuel intake of an internal combustion engine to maintain stoichiometric combustion, comprising the steps of:

measuring an output of a percent alcohol sensor indicating a percentage alcohol content in the fuel blend;

providing an electrical signal having a first voltage polarity when exhaust gas oxygen level is below a reference value and having a second voltage polarity opposite said first voltage polarity when said exhaust oxygen level is above said reference value;

generating a control signal by integrating said electrical signal in predetermined steps each sampling time and adding a first preselected value having said first polarity when said electrical signal switches from said second polarity to said first polarity and adding a second preselected value having said second polarity when said electrical signal switches from said first polarity to said second polarity;

decreasing said first preselected value relative to said second preselected value in relation to a measurement of percentage alcohol content in the fuel blend; and increasing fuel to the engine in relation to said percentage alcohol content and decreasing fuel delivered to the engine in relation to said control signal.

8. The control method recited in claim 7 wherein said first preselected value is reduced to zero when said measurement of percentage alcohol content increases to a preselected percentage.

9. The control system recited in claim 7 wherein said integration steps at said second polarity are made larger than said integration steps at said first polarity when said measurement of percentage alcohol content increases to a predetermined percentage.

* * * * *